(12) United States Patent
Lay et al.

(10) Patent No.: US 6,474,392 B1
(45) Date of Patent: Nov. 5, 2002

(54) SYSTEM FOR OPENING SEALED PACKAGES, TAPE DISPENSER, AND TAPE

(75) Inventors: Roger F. Lay, Woodbury, CT (US); John W. DeMunda, Oakville, CT (US); Phillip L. White, Prospect, CT (US); Harvey Epstein, Newton, MA (US); Robert J. Hebert, Southbury, CT (US); George LeMoine, Trumbull, CT (US)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 1 day.

(21) Appl. No.: 09/672,463

(22) Filed: Sep. 28, 2000

(51) Int. Cl.$^7$ ............................................. B65B 51/06
(52) U.S. Cl. .................. 156/575; 156/577; 156/578; 53/136.3; 53/137.2; 118/41; 118/264; 118/268
(58) Field of Search ................... 156/212, 247, 156/289, 575, 577, 578; 53/419, 136.3, 137.2; 118/264, 268, 41

(56) References Cited

U.S. PATENT DOCUMENTS

| | | | |
|---|---|---|---|
| 3,873,018 A | * 3/1975 | Donnay | 156/257 |
| 3,918,338 A | 11/1975 | Higbee | 83/449 |
| 4,380,210 A | 4/1983 | Auerbach | 118/253 |
| 5,569,327 A | * 10/1996 | Paradis et al. | 118/253 |
| 5,768,991 A | 6/1998 | Cless et al. | 101/227 |
| 5,904,805 A | * 5/1999 | Marchetti | 156/575 |
| 6,117,262 A | 9/2000 | Moulds et al. | 156/212 |

OTHER PUBLICATIONS

Better Packages, Inc. Catalog pp 1–3.

* cited by examiner

Primary Examiner—Laura Edwards
(74) Attorney, Agent, or Firm—Perman & Green, LLP

(57) ABSTRACT

A system for easy opening of sealed packages. The system comprises a tape dispensing apparatus, and a tape. The tape dispensing apparatus has a cutter therein. The tape is used for sealing a seam of a package. The tape is sized and shaped for being dispensed from the tape dispensing apparatus. The tape dispensed from the dispensing apparatus has a predetermined length cut by the cutter. The predetermined length of tape has a first side with a self-adhesive section for attaching the predetermined length of tape to the package. The predetermined length of tape also includes a non-adhesive section, and a ribbon disposed on the first side of the tape section. The predetermined length of tape has a tear strip defined by the ribbon, and non-adhesive section of the first side together. The tear strip extends longitudinally along the predetermined length of tape. The tear strip ends in a pull tab for pulling the tear strip open and opening the predetermined length of tape attached to the package.

20 Claims, 5 Drawing Sheets

SYSTEM FOR OPENING SEALED PACKAGES, TAPE DISPENSER, AND TAPE

BACKGROUND OF THE INVENTION

1. Field of the Invention

The present invention relates to a system for quick opening of sealed packages and, more particularly, to a system for opening sealed packages comprising a tape dispenser, and gummed tape dispensed fro m the dispenser to have a tear strip.

2. Prior Art

There are many methods known in the prior art for closing open seams on packages, such as for example envelopes, and cartons, in order to facilitate storage, and shipping, as well as provide security for items inside the packages. Some methods use gummed paper tape for sealing seams on envelopes, or for sealing flaps closed on cartons. These methods use gummed paper tape because of the ruggedness, and consistency of the seals formed with gummed paper tape. However, in the prior art, when desired to open cartons or packages thus sealed, some implement will typically be used because of the strength of the seal, to break through the tape and release the carton flaps. The implement may be a knife, a simple door key, a pen or even finger nails. Opening a carton is considered, by most end users, to be an inconvenience at best but may also result in injuries to the user, and damage to the carton contents by virtue of the implement penetrating too deep thereby cutting or marring the contents. The present invention overcomes the problems of the prior art as will be described in greater detail low.

SUMMARY OF THE INVENTION

In accordance with a first embodiment of the present invention, a system for opening sealed packages is provided. The system comprises a tape dispensing apparatus, and tape. The tape dispensing apparatus has a cutter therein. The tape is used for sealing a seam of a package. The tape is sized and shaped for being dispensed from the tape dispensing apparatus. The tape dispensed from the dispensing apparatus has a predetermined length cut by the cutter. The predetermined length of tape has a first side with a self adhesive section for attaching the predetermined length of tape to the package. The predetermining length of tape also has a non-adhesive section, and a ribbon disposed on the first side. The predetermined length of tape has a tear strip defined by the ribbon and non-adhesive section of the first side together. The tear strip extends longitudinally along the predetermined length of tape. The tear strip ends in a pull tab for pulling the tear strip open, and opening the predetermined length of tape attached to the package.

In accordance with a second embodiment of the present invention, a gummed tape is provided. The gummed tape comprises a tape base material and a ribbon. The tape base material has a first base layer, and a second base layer. The tape base material also includes reinforcing threads which are sandwiched between the first and second base layers. The first base layer has an outer side with a moisture activated adhesive layer thereon. The ribbon is disposed longitudinally on the outer side of the first base layer.

In accordance with a third embodiment of the present invention, a gummed tape dispensing apparatus is provided. The gummed tape dispensing apparatus comprises a frame, a feeding mechanism and a wetting system. The frame has a storage area for storing gummed tape therein. The frame also has an exit area through which gummed tape is dispensed. The feeding mechanism is connected to the frame. The feeding mechanism feeds the gummed tape from the storage area to the exit area. The wetting system is also connected to the frame for wetting a side of the gummed tape and activating a moisture activated adhesive on the side of the gummed tape. The wetting system has a shield which covers part of the wetting system and prevents a portion of the side of the gummed taped from being wetted while an adjoining portion of the side of the gum tape is wetted by the wetting system when the gummed tape is fed past the wetting system by the feeding mechanism.

In accordance with a fourth embodiment of the present invention, a gummed tape dispensing apparatus is provided. The gummed tape dispensing apparatus comprises a frame, a feeding mechanism, a cutting section, and a wetting system. The frame includes a storage area for storing gummed tape therein. The frame has an exit area through which gummed tape is dispensed. The feeding mechanism is connected to the frame. The feeding mechanism feeds the gummed tape from the storage area to the exit area of the frame. The cutting section is mounted to the frame. The cutting section has a cutting blade for cutting the gummed tape into sections dispensed through the exit area. The wetting system is connected to the frame for wetting a side of the gummed tape and activating a moisture activated adhesive on the side of the gummed tape. The cutting blade has a first cutting edge from making a transverse cut across the tape. The cutting blade also has a pair of secondary cutting edges projecting from the cutting blade for cutting slits into each section cut by the cutting blade. The slits are at an angle to the transverse cut.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
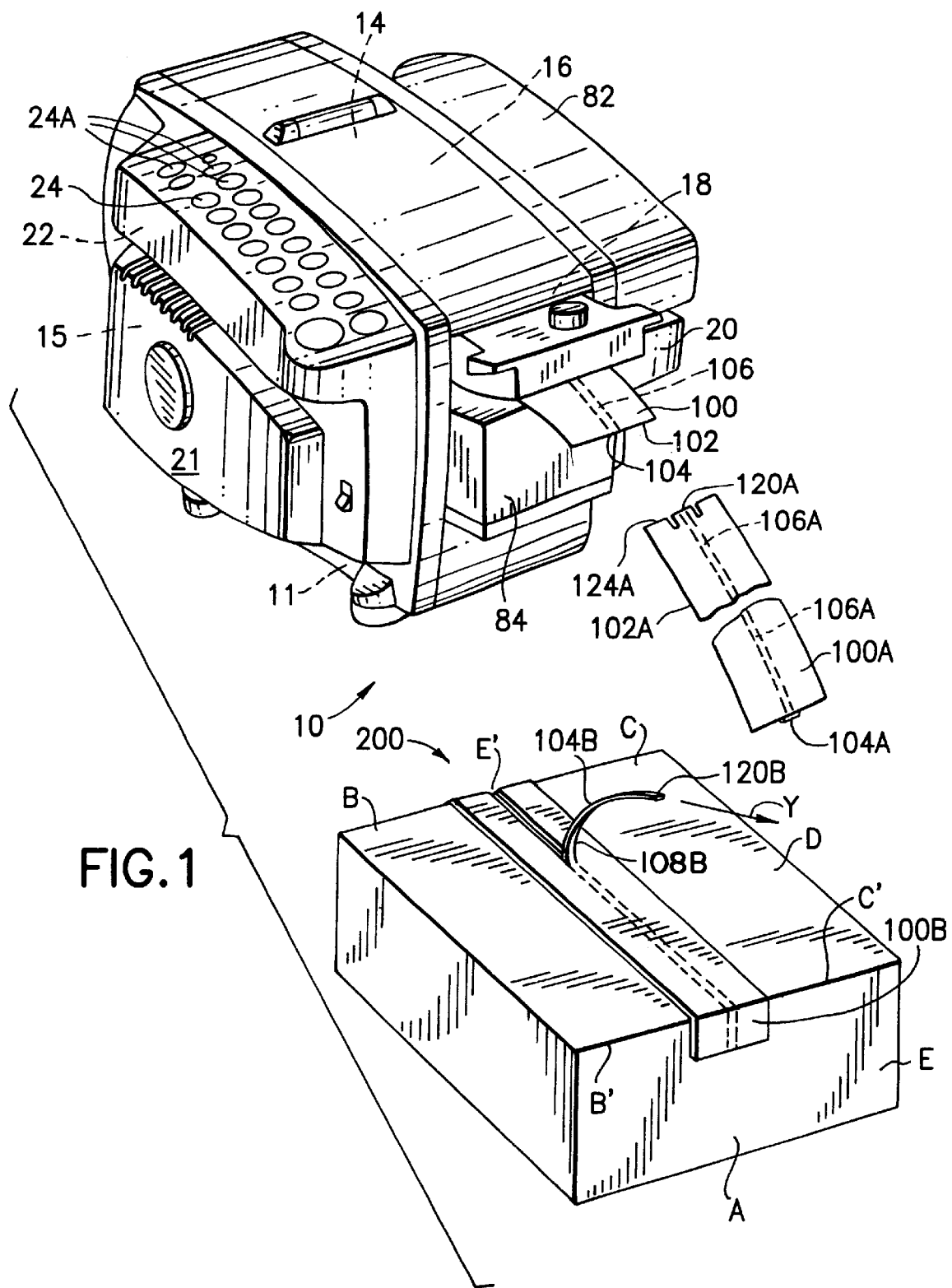
FIG. 1 is a schematic perspective view of a system for easy opening sealed packages which incorporates features of the present invention, and a package.

Referring to FIG. 1, there is shown an exploded perspective view of a tape dispensing system 10 incorporating features of the present invention, and a package A. Although the present invention will be described with reference to the single embodiment shown in the drawings, it should be understood that the present invention can be embodied in many alternate forms of embodiments. In addition, any suitable size, shape or type of elements or materials could be used.

The package A is shown for example purposes in FIG. 1, as being a carton having a general hexahedron shape. The package A has at least two generally rectangular flaps B, C on at least one side D of the package. When the flaps B, C are folded closed, a seam E' is formed between the flaps. Seams B', C' are also formed between the folded flaps B, C and one or more of the adjoining sides E of the package A. In alternate embodiments, the package may be of any other suitable type or configuration, such as for example, seamed envelopes of suitable shape and size, or any other suitable containers or cartons of any other suitable shape, and having flaps forming sealable seams.

In accordance with the present invention, the system 10 generally comprises a tape dispensing apparatus 12, and tape 100. Tape 100 is adapted to be dispensed from tape dispensing apparatus 12. The tape 100 is preferably gummed paper tape which has an adhesive underside 102. The tape 100 has a flat ribbon 104 attached to the adhesive underside 102 so that the ribbon 104 extends longitudinal along the tape. The adhesive on the gummed tape 100 is initially in an inactive state. As will be described in greater detail below, the tape 100 is stored and dispensed from tape dispensing apparatus 12. The tape 100 is cut by the tape dispensing apparatus 12 into sections, such as for example, section 100A, 100B of desired length to be used for sealing seams on packages. The adhesive on the tape is activated by the tape dispensing apparatus 12 so that the cut sections 100A, 100B are self-adhesive. The tape dispensing apparatus 12 does not activate the adhesive along a strip 106, 106A, 106B of the tape section 100A, 100B dispensed from the tape dispensing apparatus. When the section of tape 100A, 100B is applied to a package A to close the seam E' between flaps B, C, the section of the tape with activated adhesive attaches to the package A thereby sealing the package. The ribbon 104B and strip 106B of the tape section 100B cooperate on the tape section 100B to form a tear strip 108B in the tape section attached to package A. The tear strip 108B in the tape section 100B is provided with a starting tab 120B cut into the tape section by the tape dispensing apparatus 12. The tear strip 108B and pull tab 120B do not adhere to the package A when the tape section 100B is attached to the package. Accordingly, when a user desires to open a seam of a package sealed with a tape section 100B the user lifts and pulls on the start tab 120B which starts tearing the tear strip 108B from the tape section 100B which seals the package A. The tear strip 108B is pulled as desired to open the seal formed by the tape section.

Figure 2:
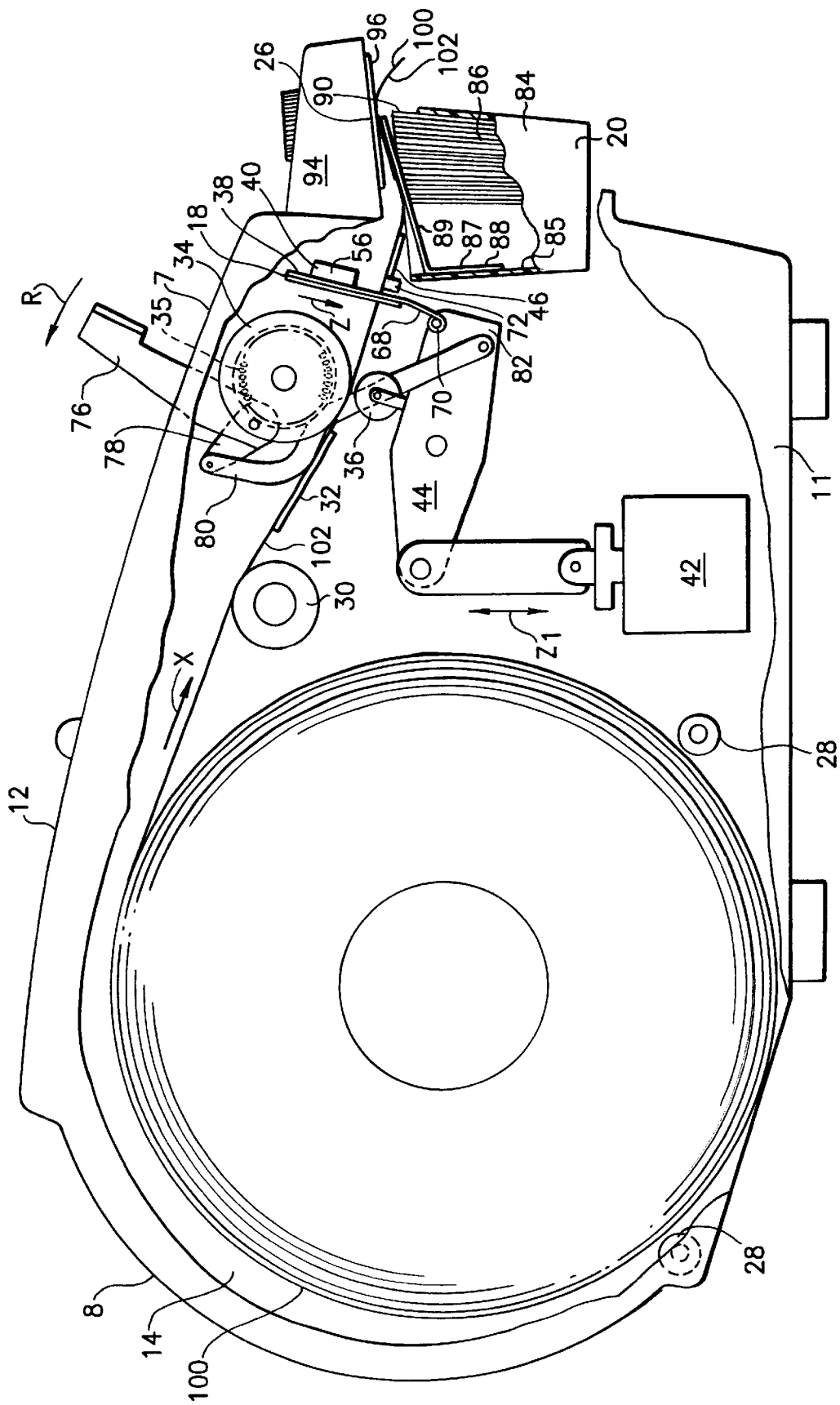
FIG. 2 is a schematic elevation view of a tape dispensing apparatus with a roll of tape of the system in FIG. 1.

In greater detail, and with reference now also to FIG. 2, the tape dispensing apparatus 12 generally comprises a frame 11, a tape storage area 14 defined in the frame 11, a tape feeding mechanism 16, a cutting section 18, and a wetting system 20. The feeding mechanism 16, cutting section 18, and wetting system 20 are mounted to the frame 11. Housing 21 covers the frame 11. The tape dispensing apparatus 12 has an exit 26 through which tape 100 is dispensed. The tape is stored in the tape storage area 14. The feeding mechanism 16 draws tape out of the storage area and feeds it past the cutting section 18, and wetting system 20, and then to the exit 26 through which the tape is dispensed from the apparatus. The tape is cut at the cutting section 18. The wetting system 20 wets the tape to activate the moisture activated adhesive as will be described in greater detail below. Preferably, the apparatus 12 includes a programmable controller 22 which is controllably connected to the feeding mechanism 16, cutting section 18, and wetting system 20 of the apparatus 12. A user interface 24 is provided to allow a user to interface with controller 22. In the preferred embodiment, the user interface 24 has function keys 24A, used by the user to input commands, such as for example, "Start/Stop", and identifying the dispensed tape lengths, to the controller 22. In alternate embodiments, the user interface may use any other input means such as a touch display, or PC keyboard for entering commands in the controller.

The tape storage area 14 is generally located towards the rear 8 of the frame 11. In the preferred embodiment, the tape storage area 14 is sized and shaped to hold tape 100 in a roll configuration. The roll is positioned vertically in the frame. In alternate embodiments, the tape may be stored in the storage area in any other suitable configuration. The tape storage area 14 is provided with support rollers 28 which support the tape roll stored therein. The roller configuration shown in FIG. 2 is merely for example purposes, and the support rollers may be arranged in any other suitable configuration. The support rollers 28 are disposed to aid relatively unencumbered rotation of the tape roll when the feed mechanism 16 draws tape out of the storage area 14.

The feeding mechanism 16 generally comprises idler rollers 30, guide trays 32, feed roller 34, pinch roller 36, and drive motor 15. The idler rollers 30 (only one idler roller 30 is shown in FIG. 2 for example purposes) are located between the tape storage area 14 and feed roller 36. The idler rollers 30 support and guide the tape in the feed direction (indicated by arrow X) to the feed rollers 34. As shown in FIG. 2, one or more guide trays 32 are mounted to the frame 11 in the proximity of the feed roller 34. The guide trays are shaped and orientated such that the tape riding upon the guide trays 32 is orientated true to the feed direction X of the feed mechanism 16, and aligned with the feed roller 34. This prevents the tape from being skewed or twisted when fed by the feed roller 34. Feed roller 34 is preferably located towards the front 7 of the apparatus 12. The feed roller 34 is drivingly connected to electric motor 15 (see FIG. 1) by suitable transmission means (not shown) such as a belt, or chain drive. When the electric motor 15 is energized, under control from controller 22, the motor rotates the feed roller 34 in a suitable direction (e.g. counterclockwise) to transport the tape is the feed direction X of the feed mechanism. Friction contact between the feed roller 34 and the tape causes the tape to move when the feed roller turns. Friction contact between the tape and feed roller 34 is enhanced in the preferred embodiment by a pinch roller 36 which is located on the opposite side of the tape from the feed roller 34 (see FIG. 2). When in the engaged position, shown in FIG. 2, (the pinch roller also has a disengaged position as will be described below) the pinch roller 36 presses the tape against the feed roller 34 thereby increasing the friction force between roller and tape. From the feed roller 34, the tape is transported to the cutting section 18, wetting system 20, and exit 26 of the apparatus 12. In the preferred embodiment, the feed roller 34 is connected to a counter 35 which can indicate the rotation of the feed roller, and hence, the amount of tape being fed, to the controller 15. The feeding mechanism 16 described above and shown in FIGS. 1–2, is merely one example of a suitable feeding mechanism which may be used in the tape dispensing apparatus of the present invention. The present invention is equally applicable to dispensing apparatus having any other suitable feeding mechanism such as for example a manually operated feeding mechanism.

Figure 3A:
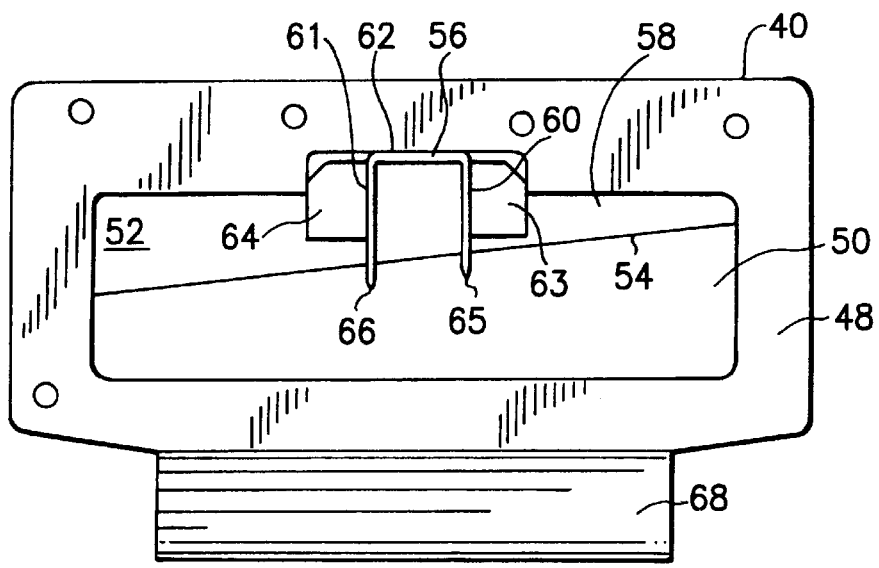
FIGS. 3A–3B are respectively a front elevation view and a side elevation view of a cutting blade of the tape dispensing apparatus in FIG. 2.
Figure 3B:
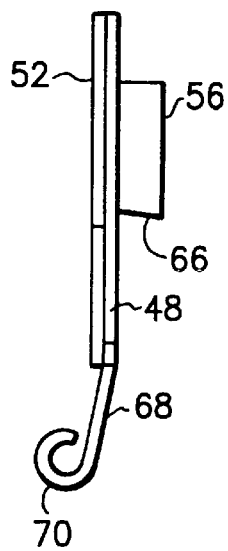
Figure 3C:
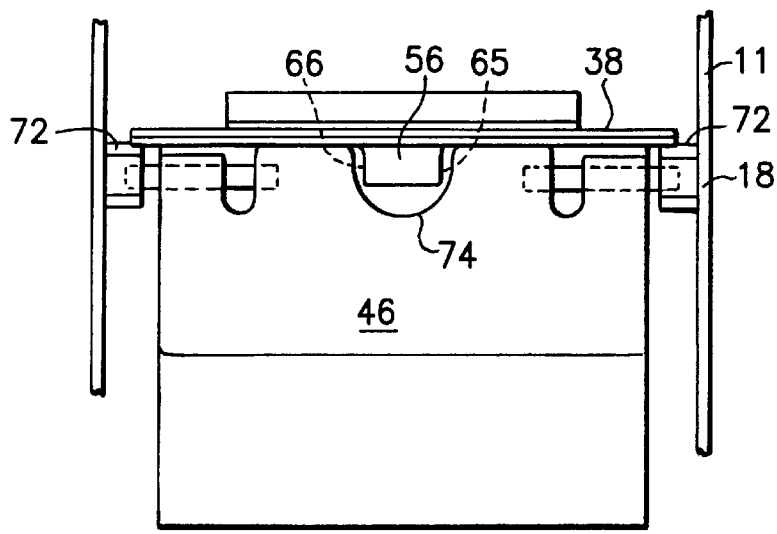
FIG. 3C is a partial plan view of the cutting blade mounted in the tape dispensing apparatus.

Referring now also to FIG. 3C, the cutting section 18 of the apparatus 12 has a cutting mechanism 38. The cutting mechanism 38, which is operated by controller 22 to cut the tape fed past the cutting section 18, generally comprises support tray 46, cutting blade 40, spring loaded solenoid 42, and pivot link 44. The cutting blade 40 is shown in greater detail in FIGS. 3A–3B. The cutting blade 40 preferably comprises a frame member 48, and a blade member 52. The blade member 52 is substantially flat and has a cutting edge 54. Blade tab 56 is mounted to a side 58 of the blade member 52. In the preferred embodiment, blade tab 56 is a one piece member which may be stamped, or cut from suitable sheet metal. The blade tab 56 has a general U-shape with two sidewalls 60, 61 connected by bottom wall 62. Alternatively, the blade tab may have any other suitable shape, such as for example, a V shape. In the preferred embodiment, sidewall 60 is shorter than sidewall 61. Each sidewall 60, 61 has a corresponding mounting tab 63, 64, cantilevered therefrom (see FIG. 3A). The free edge each sidewall 60, 61 is sharpened to form a cutting edge 65, 66. In the preferred embodiment, blade tab 56 is mounted to blade member 52 by seating, and spot welding or brazing the mounting tabs 63, 64 to the side 58 of the blade member 52. As seen in FIG. 3A, the blade tab 56 is mounted on blade member 52 with cutting edges 65, 66 pointed in the same direction (i.e. down) as the cutting edge 54 of the blade member. With the blade tab 56 mounted to the blade member 52, cutting edges 65, 66 are located to project somewhat below the cutting edge 54, and also project generally perpendicularly from the cutting edge 54 of the blade member 52. In alternate embodiments, the blade member and blade tab may be connected in any other suitable manner. For example, the blade tab and blade member may be formed as an integral unit by casting or forging the blade member into the desired shape. As shown in FIGS. 3A–3B, the blade member 52 is mounted to the side of frame member 48. The blade member may be connected to the frame member 48 by spot welding, brazing, mechanical fastening, or any other suitable method. The cutting edges 54, 65, 66 of the blade member and blade tab are exposed in the interior opening 50 of the frame member 48. The blade member 52 is mounted to the frame member 48 to position the cutting edge 54 at an angle in opening 50 such as in a guillotine. Frame member 48 has a lower arm member 68 depending from the bottom. The lower arm member 68 terminates in a sleeve 70.

As can be seen in FIGS. 2 and 3C, the cutting blade 40 is slidably supported in frame 11 by guide rails 72. Guide rails 72 allow the cutting blade 40 to slide, in the direction indicated by arrow Z between an up position (shown in FIG. 2), and a down position (not shown). In the preferred embodiment, the cutting blade 40 is orientated generally transverse to the tape as the tape is being fed by the feed mechanism 16 past the cutting blade 40. For example, the cutting blade 40 is generally perpendicular to support 46. In addition, the cutting blade 40 is positioned in the frame 11 such that the tape is fed through the opening 50 in frame member 48 when the cutting blade 40 is in the up position, and when in the down position, cutting edge 54 cuts completely through the tape. Support tray 46, which supports the tape and prevents it from buckling during the cutting blades down stroke, has a cut out 74. The cutout 74 allows the cutting edges 65, 66 on blade tab 56 to pass by the support tray 46, and hence, cut into the tape. As can be seen in FIG. 2, in the preferred embodiment, the cutting blade 40 is mounted in the frame 11 with blade tab 56 projecting forwards from blade member 52 of the cutting blade.

Lower arm member 68 of cutting blade 40 is connected by a pin to one end of pivot link 44. Pivot link 44 is pivotably mounted in the middle to frame 11. The opposite end of pivot link 44 is connected to a spring loaded solenoid 42 which moves generally up and down when the solenoid is opened and closed. The up and down motion of the solenoid 42 is transferred to the cutting blade 40 by pivot link 44 so that the cutting blade is moved up and down under control of controller 22 (see FIG. 1). By way of example, in the preferred embodiment, cutting blade 40 is initially in the down position (not shown) and the solenoid 42 is open. When the solenoid 42 is energized, under a suitable command from controller 22, solenoid 42 is closed which pivots pivot arm 44 to move the cutting blade 40 to the up position shown in FIG. 2. Deenergizing the solenoid 42 again causes the spring loaded solenoid 42 to return to its open position which, via pivot link 44, in turn moves the cutting blade 40 back to its down position. As shown in FIG. 2, pinch roller 36 of the feeding mechanism 16 may also be mounted off the pivot link 44 such that when the solenoid 42 is energized the pinch roller 36 is moved up to press the tape against the feed roller, and when the solenoid 42 is deenergized, the pinch roller 36 is moved down to release the tape (not shown). In alternate embodiments, the cutting blade may be moved up and down by any other suitable means such as directly driving the blade with a compressed air, or fluid piston.

In the preferred embodiment, the apparatus 12 is provided with a lift arm 76 for manually raising and lowering the cutting blade 40 in the frame 11. Lift arm 76 is pivotably connected to frame 11 so that the arm may be rotated between a lowered position and a raised position (arm 76 is shown in the raised position in FIG. 2 for example purposes). The arm 76 is connected to a crank member 78 at one end. The crank member 78 is connected via link 80 to the same end 82 of pivot link 44 to which the cutting blade 40 is connected. The cutting blade 40 may thus be raised and lowered manually by raising and lowering the lift arm 76. By way of example, when the cutting blade 40 is in the down position (not shown), which is the initial position of the cutting blade when the apparatus is deenergized, the lift arm is in its down position (not shown). In order to raise the blade without energizing the apparatus, the lift arm 76 is raised by rotating the arm in the direction indicated by arrow R in FIG. 2, to the up position. This in turn raises (via link 80) the end 82 of pivot link 44 to which the cutting blade 40 is connected, thereby sliding the cutting blade to the up position shown in FIG. 2. In alternate embodiments, the tape dispensing apparatus may include any other suitable means for manually moving the cutting blade.

Figure 4A:
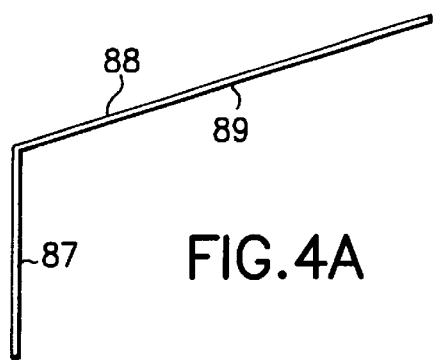
FIGS. 4A–4B are respectively a side elevation view, and a rear elevation view of a moisture shield of the tape dispensing apparatus in FIG. 2.
Figure 4B:
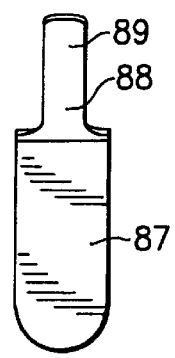
Figure 4C:
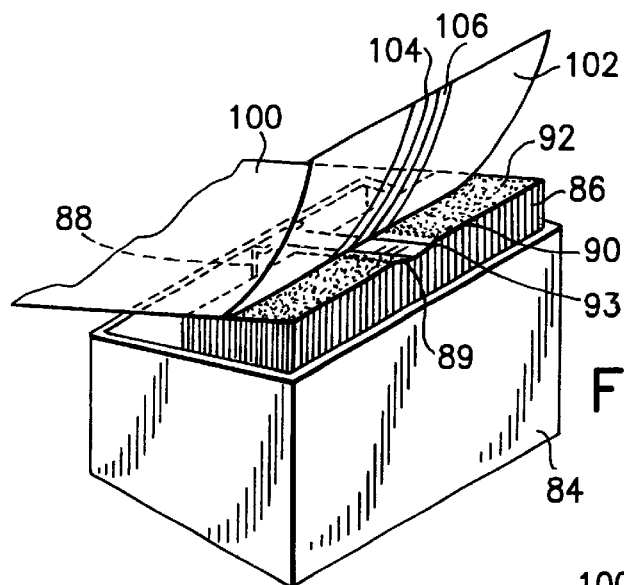
FIG. 4C is a partial perspective view of the tape dispensing apparatus, showing the arrangement of the moisture shield relative to the tape fed by the tape dispensing apparatus and the water tray of the apparatus.

Referring now to FIGS. 1–2, and 4C, in the preferred embodiment, the wetting system 20 of the apparatus 12 generally comprises a fluid reservoir or bottle 82, a basin or tray 84, a wetting brush 86 and a moisture shield 88. Tray 84 is mounted to the front 7 of frame 11, and is open at the top. The tray 84 of wetting system 20 holds a suitable fluid, such as for example, water for activating of the moisture activated adhesive on the tape dispensed from the apparatus. Bottle 82 holds a fluid reserve. The bottle 82 is mounted external to the housing 21 to feed reserve fluid into the tray 84 at a suitable rate to replenish the fluid therein. In the preferred embodiment, the reserve bottle 82 is removable. This allows the bottle to be removed at a suitable time and refilled without interrupting operation of the tape dispensing apparatus. The wetting brush 86 is located inside the tray 84. The top 90 of the brush 86 projects above the lip of tray 84 (see FIG. 4C). The bottom of the brush 86 sits in the fluid bath in tray 84. The brush 86 is made of a suitable material to allow fluid to be drawn, by capillary action, along the bristles of the brush from the fluid bath in which the bottom of the brush is immersed to the top 90 of the brush 84. The bristle density in the brush 86 is sufficient to provide the top 90 of the brush with a consistent wetting surface 92. The brush 86 is located in the tray 84 so that the wetting surface 92 of the brush is generally coincident with the bottom surface of the tape 100 being dispensed through exit 26 of the apparatus (see FIGS. 2 and 4C). Accordingly, when tape, fed by feeding mechanism 16, is dispensed through exit 26 of the apparatus, the bottom surface of the tape contacts the wetting surface 92 of the wetting system 20 thereby wetting the tape.

In the preferred embodiment, the apparatus 12 is provided with a heater element 94 (see FIGS. 1–2). The heater element 94 referably has a heating plate 96 which is disposed over the wetting surface 92. The position of heating plate 96 may be adjusted vertically to bring the plate into contact with wetting surface 92. The heating plate thus directly warms the wetting surface 92 and then via heat transfer through the wet bristles of brush 86 warms the fluid bath in tray 84. The heating plate 96 may be raised away from the wetting surface 92 when tape 100 is being dispensed from the apparatus and being wetted from wetting surface 92. In this case, thermal inertia of the fluid bath in tray 84 maintains the wetting surface 92 warm for a desired period of time. In alternate embodiments, the fluid in the wetting system holding tray may be heated by any other suitable means.

As can be seen in FIGS. 2 and 4C, the wetting system 20 has a shield 88 for selectively wetting portions of the bottom of the tape dispensed from the apparatus 12. Referring now also to FIGS. 4A–4B, the shield 88, in the preferred embodiment, is a one piece member made from a sheet of suitable material, such as for example, stainless steel though any other suitable material may be used including plastic. The shield 88 has a base member 87, and a tab or arm 89 depending therefrom. In alternate embodiments, the shield may have any other suitable configuration. For example, the arm depending from the base may not be flat, but could have a general V or U-shaped cross section, or. any other suitable cross section. The shield 88 is mounted to the tray 84. Base member 87 of the shield 88 is disposed against the rear side 85 of the tray 84. In alternate embodiments the shield may be mounted to any other side of the tray, or may be mounted off the frame of the apparatus. The base member 87 is clamped or fastened to the tray 84 by any suitable means (not shown). Arm 89 of shield 88 is biased against the top 90 of the brush 86 in the tray 84. This presses a strip 93 of the top 90 of the brush down below the wetting surface 92. The shield 88 is positioned on the tray 84 so that arm 89 generally bisects the wetting surface 92. When the tape is dispensed from the tape apparatus 12, the bottom of the tape comes in contact with wetting system 92 but is otherwise prevented by shield arm 89 from contacting strip 93 on the top of the brush. Thus, as the bottom of the tape passes across the top 90 of the brush, the bottom of the tape has a strip along the middle which is generally unwetted, while the sections of the bottom on either side are wetted by the wetting system as will be described in greater detail below.

Figure 5A:
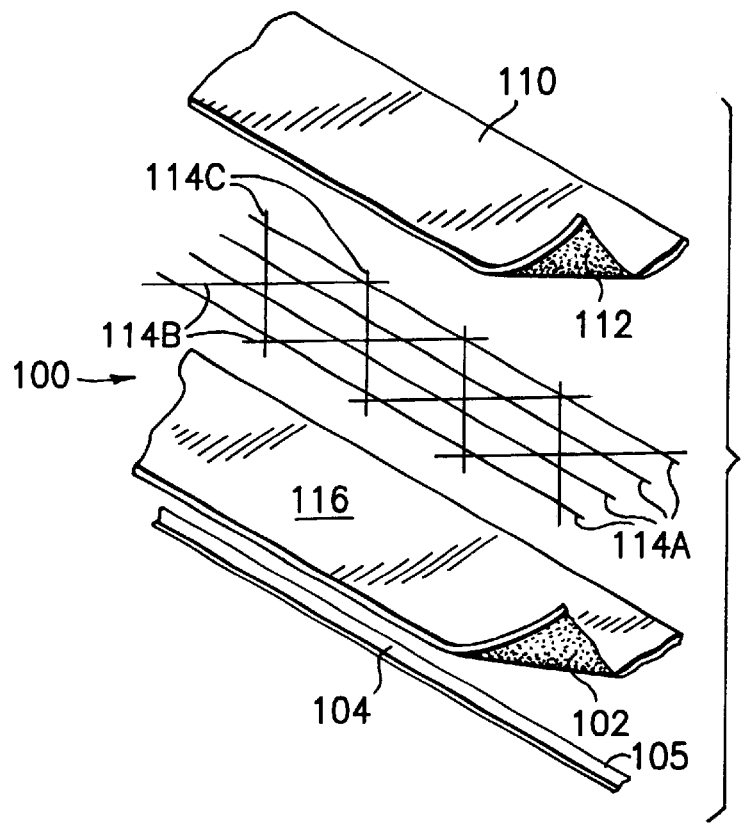
FIG. 5A is an exploded perspective view of a section of the tape used in the system shown in FIG. 1.
Figure 5B:
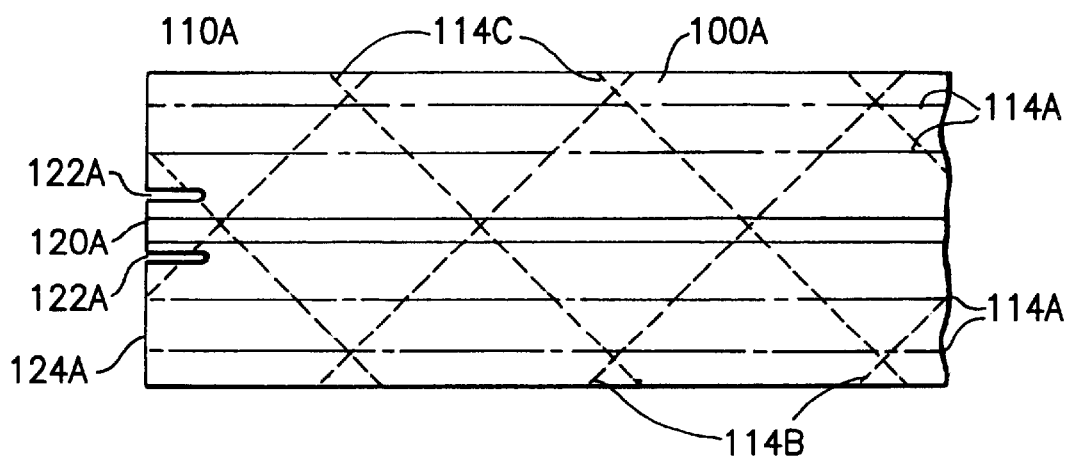
FIG. 5B is a top plan view of a section of the tape dispensed from the tape dispensing apparatus in accordance with a first preferred embodiment of the present invention.

Referring now to FIGS. 5A–5B, there is shown respectively and exploded perspective view, and a top plan view of the tape 100 in accordance with the present invention. Though the description of the tape will be with particular reference to tape 100, sections 100A, 100B of the tape are substantially similar. As noted before, tape 100 is preferably reinforced gum paper tape, though any suitable type of tape may be used including plastic tape. In the preferred embodiment, the tape generally has a top layer 110, a pressure contact layer 112, reinforcing strands 114A–114C, a bottom layer 116, and a ribbon 104. The top layer 110, and bottom layer 116 are made of suitable paper, such as for example, virgin kraft, high tensile paper having a 24 lb. basis weight, though any other suitable paper may be used. In alternate embodiments, the top and bottom paper layers may be made of different paper such as for example, the top layer may have heavier weight paper than the bottom layer or vice versa. The top and bottom layers 110, 116 are substantially the same width. The width of the top and bottom layers is preferably about 60 mm, though the present invention is equally applicable to gum tape of any width and length. The contact pressure layer 112 is preferably made of an amorphous polypropylene laminate material which is non-asphaltic, such as that made by Huntsman Chemical, though any other suitable pressure contact material may be used. The pressure contact layer 112 is preferably a flexible, water resistant, non-staining layer. The pressure contact layer 112 preferably has a high melt point index with a softening point between about 180° and 200° F. In the preferred embodiment, tape 100 has an array of reinforcing strands 114A–114C in three directions. In alternate embodiments, the gummed tape may be reinforced in any number of directions, or may not be reinforced with reinforcing strands. Reinforcing strands 114A–114C may be made of fiberglass, or any other suitable strand material of appropriate tensile strength, including plastic, or organic fiber (e.g. cotton). Each strand 114A is preferably made from 150 denier fiberglass filament. Each strand 114B and 114C is preferably made from 450 denier fiberglass filament. The ribbon 104 of tape 100 may be made from either biaxially oriented polypropylene (BOPP), or mono-axial polypropylene (MOPP) material. In alternate embodiments, the ribbon of the gummed tape may be made of any other suitable material, such as for example, metallic ribbon, non-metallic carbon fiber, or organic fiber. The ribbon 104 preferably has a width of about 2.5 to 3 mm, and a thickness of about 26 to 40 microns, though the ribbon may have any other suitable width and thickness dimensions. The ribbon 104 is provided with a suitable self-adhesive on one side 102.

In the preferred embodiment, tape 100 may be manufactured as follows. The top layer 110, with the pressure contact layer 112 thereon, the reinforcing strands 114A–114C, the bottom layer 116, and the ribbon 104 are pressed together. The reinforcing strands 114A–114C are sandwiched between the top and bottom layers 110, 116. The contact pressure layer 112 may be deposited on the underside of the top layer 110 (see FIG. 5A) before the top and bottom layers 110, 116 are pressed together. The contact pressure layer 112 may be deposited on layer 110 using a hot melt method wherein the amorphous polypropylene material is melted and then applied by suitable means (not shown) in a layer of suitable thickness to the underside of top layer 110. When applied to the top layer 110, the contact pressure layer 112 forms an adhesive bond therewith. The contact pressure layer 112 is also in an adhesive state so that it may form an adhesive bond when pressed against the bottom layer 116. The reinforcing strands 114A–114C may be placed between the top and bottom layers 110, 116 before the top and bottom layers are joined together with the pressure contact layer 112. As shown in FIG. 5B, reinforcing strands 114A–114C are laid out to provide three way reinforcement. In the preferred embodiment, there are four strands 114A, though any other suitable number may used, which are orientated into longitudinal or machine direction of the tape 100. The longitudinal strands 114A are distributed equally across the width of the tape. Reinforcing strands 114B, 114C are oriented diagonally across the tape at an angle about 42°, though any other suitable angle may be used. Reinforcing strands 114B extend in one direction, and strands 114C extend in the opposite direction forming a crossing pattern with strands 114B. The strands 114B, 114C crossing in each direction may be spaced at about 50 mm to 60 mm apart, though any other spacing may be provided between the crossing strands. The tape composite may be pressed together by any suitable means such as rollers (not shown). In combination with the pressure, heat may be applied with appropriate means (not shown) in order to cure the pressure contact layer 112 if desired and form a bond between the top and bottom layers 110, 116. Reinforcing strands 114A–114C are thus sandwiched between top and bottom layers 110, 116 and are then substantially fixed in the matrix formed by the now set pressure contact layer 112. As can be seen in FIG. 5A, in the preferred embodiment, the lower surface 102 of the bottom layer 116 has an adhesive deposited thereon. In alternate embodiments, the adhesive may be deposited on the bottom of the tape after the tape is manufactured, or during the manufacture of the tape. The adhesive is preferably a moisture activated adhesive, such as for example, an organic, non-toxic adhesive with a modified corn starch, smooth coat, high tack formulation, though any other suitable organic, or non-organic adhesive may be used. The adhesive may be deposited on the bottom layer 116 by any suitable means, such as spraying, rolling, or brushing the adhesive onto the bottom layer. The adhesive on the lower surface 102 of the bottom layer 116 of tape 100 is in an inactive (i.e. non-adhesive) state when the tape is manufactured. The adhesive surface 102 may then be activated by adding heat and moisture as will be described in greater detail below. Ribbon 104 is preferably pressed to surface 102 of the bottom layer 116 when the tape 100 is manufactured. In alternate embodiments, the ribbon may be deposited on the lower surface of the bottom layer of the tape prior to or even after tape manufacture. The ribbon 104 is applied to bottom layer 116 with the self-adhesive side 105 against surface 117. The self-adhesive on side 105 thus connects the ribbon 104 to the lower surface 102 of the tape. The ribbon is preferably placed substantially along the center line of the tape 100. The ribbon may be applied in a generally sinusoidal shape (not shown) which is substantially centered along the centerline of the tape in order to facilitate winding the tape into rolls. The sinusoidal shape may be shallow with a period of about 6" to 12" and an amplitude of about 1/16. In alternate embodiments the ribbon may be applied generally straight. Tape 100 can be manufactured thus in any suitable lengths such as 500 ft or more which can be wound in rolls for use with a tape dispensing apparatus 12.

Referring now to FIGS. 1, 4C, and 5B, a user may dispense tape 100 from dispensing apparatus 12 as described below. As noted before, tape 100 is loaded into storage area 14 in a roll configuration. Water is added to wetting system 20. The user energizes the apparatus 12 which initiates controller 22. Using user interface 24, the user may program the controller 22 to dispense tape 100 into sections such as sections 100A having a desired length. The controller 22 then opens spring loaded solenoid 42, and activates the feed system motor 15. When the solenoid 42 is opened, cutting blade 40 which is initially down, is moved by link 44 to the up position (see FIG. 2). The link 44 also raises pinch roller 36 to press tape 100 against feed roller 34. The feed system 16 operates to feed tape 100 through opening 50 of the cutting blade 40 (see FIG. 3A) which now is in the up position. The tape 100 continues in the feed direction (indicated by arrow X in FIG. 2) to the wetting system 20. The tape is configured in the storage area 14 of the apparatus 12 so that when the tape 100 reaches the tray 84 of the wetting system 20, the lower surface 102 (having the moisture activated adhesive thereon) faces the top 90 of wetting brush 86 (see FIG. 4C). Shield 88 is generally aligned with ribbon 104 of the tape 100. Arm 89 is sufficiently wide to cover the ribbon 104. As the tape 100 is being fed, wetting surface 92 of brush 86 brushes against surface 102 of the tape 100, except in way of the shield arm 89. Shield arm 89 prevents a portion of the lower surface 102 of the tape from coming into contact with the brush 86. This forms a strip 106 as the tape 100 is fed where surface 102 is not wetted (see FIG. 4C). The ribbon 104 of tape 100 is located on strip 106. Moisture from wetting surface 92 deposited on the tape 100 activates the moisture activated adhesive of the tape on surface 102 except on strip 106. If desired, the heater element 94 may have been previously activated to heat the water in tray 84 and on brush 86 to a desirable temperature. This enhances the activation of adhesive on surface 102 except on strip 106. The moisture activated adhesive on strip 106 remains dry and inactived. When controller 22 senses, from counter 35, that the desired length of tape has been dispensed, the controller deactivates the spring loaded solenoid 42. This brings the cutting blade 40 down and cuts the tape 100 into a section such as section 100A (see also FIG. 5B).

Cutting blade 40 cuts the tape transversely across, to form a tape section 100A and form start tab 120A at the proximate end 124A of the cut section of tape 100A. Start tab 120A is formed by edges 66, 65 of the cutting blade (see FIG. 3A) which cut two substantially parallel slits 122A into the end 124A of the tape section as shown in FIG. 5B. The slits 122A are formed on either side of the strip 106A such that the tab 120A is within the strip 106A having inactivated adhesive. The cut section of tape 100A may then be placed on a package to close a seam of the package.

The section of tape 100A, may be placed on the package preferably with the strip 106A which has inactivated adhesive as well as ribbon 104A thereon, generally aligned with the seam of the package being closed. By way of example, in FIG. 1, tape section 100B shown as having been already applied to package A, has been applied so that strip 106B which is substantially similar to strip 106A is generally aligned with seam E' sealed by the tape section 100B. The apparatus 12 may be provided with a folding, or crease forming mechanism (not shown) which forms the tape section dispensed from the apparatus into a general V-shape (not shown) with the strip (similar to strip 106A of tape section 100A) being located at the bottom of the V. This shape, by increasing longitudinal rigidity of the tape, renders the tape self supporting when emerging from the dispensing apparatus exit thereby preventing the tape with now activated adhesive from drooping down onto a bench/table top (not shown) holding the apparatus. Moreover, the V-shape facilitates aligning strip 106A of the tape section 100A with the seam in the package to which tape section 100A is being applied. Once aligned with the seam, the tape section may be pressed against the package so that activated adhesive on surface 102A bonds the tape to the package and seals the seam. Strip 106A with dry inactivated adhesive, and with ribbon 104A thereon is not bonded to the package. Once the tape section is bonded to the package, such as for example, tape section 100B, strip 106B and ribbon 104B together form a tear strip 108B in the tape section applied to the package A. The start tab 120B is located at one end of the tear strip 108.

As shown in FIG. 1, when desiring to open seam E' of the package A, the user merely lifts and pulls on start tab 120B of the tape section 100B. The start tab 120B which is part of unbonded strip 106B is also not bonded to the package A and may be readily lifted and pulled by the user. The tab 120B is pulled in the direction indicated by arrow Y in FIG. 1. Pulling the start tab 120B, which has a portion of ribbon 104B thereon, in turn, pulls ribbon 104B in strip 106B thereby tearing of the tear strip 108B from the tape 100B and opening seam E'. Tear strip 108B tears easily because the strip 106B which forms the tear strip 108B is not bonded to the package. This allows the pulling force delivered by the user to be transmitted in part, in tearing the tape, rather than pulling against the adhesive holding the tape 100B on the package A. Moreover, ribbon 104B which is on strip 106B is also free to lift off the package, and provides mechanical advantage to break reinforcing strands (similar to strands 114B, 114C in FIG. 5B) of the tape 100B. As can be seen in FIG. 1, the tearing of the tearing strip 108B from the tape section 100B applied to package A, preferably causes permanent, visible damage to the tape section 100B in the form of the uplifted, and torn strip 108B. Accordingly, this provided an indication to a recipient user receiving the package A, that the package A may have been tampered with. Thus, it is also within the scope of the present invention to provide a security system 200 (see FIG. 1) for packages, wherein the tape 100B applied to the package A as described previously gives an indication to the user, such as by the visibly torn strip 108B, that the package A has been tampered with. Once tear strip 108B has been torn, the tape section cannot be restored to its original condition, and the evidence of tearing will remain visible to a user.

Figure 6:
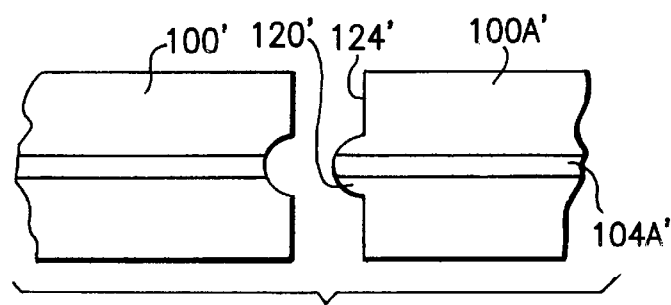
FIG. 6 is another top plan view of a section of the tape dispensed from the tape dispensing apparatus in accordance with a second preferred embodiment of the present invention.
Figure 7:
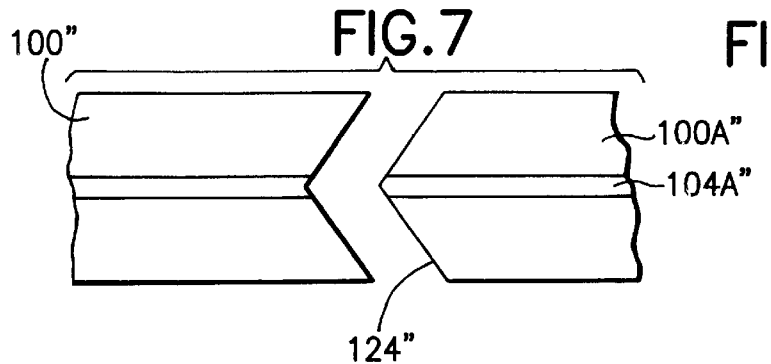
FIG. 7 is still another top plan view of a section of the tape dispensed from the tape dispensing apparatus in accordance with a third preferred embodiment of the present invention.

Referring now to FIG. 6 there is shown a plan view of tape 100' cut into sections in accordance with a second preferred embodiment of the present invention. Tape 100' is substantially similar to tape 100 described previously and shown in FIGS. 1, 5A–5B. Hence, similar features have similar numbers. Tape 100' is cut when dispensed from a tape dispensing apparatus (not shown) so that the proximal end 124' of the cut section 100A' has a start tab 120' which projects from the end 124'. Start tab 120' has a generally semicircular configuration, though in alternate embodiments, the start tab projecting from the cut end of the tape section may have any other suitable shape. FIG. 7 shows still another plan view of a tape 100" cut into sections in accordance with another preferred embodiment of the present inventions. In this embodiment, the proximal end 124" of the cut section 100A" has a general V shape. The apex of the V shaped end 124" generally coincides with the location of ribbon 104A" on the tape 100A".

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An easy to open package sealing system, the system comprising:
   a tape dispensing apparatus having a cutter therein; and
   a tape for sealing a seam of a package, the tape being sized and shaped for being dispensed from the tape dispensing apparatus, the tape dispensed from the dispensing apparatus having a predetermined length cut by the cutter;
   wherein the predetermined length of tape has a first side with a self adhesive section for attaching the predetermined length of tape to the package, a non-adhesive section, and a ribbon disposed on the first side, and wherein the predetermined length of tape has a tear strip defined by the ribbon and non-adhesive section of the first side together, and extending longitudinally along the predetermined length of tape, the tear strip ending in a pull-tab for pulling the tear strip open and opening the predetermined length of tape attached to the package.

2. A system in accordance with claim 1, wherein the ribbon is between the first side of the predetermined length of tape and the package when the predetermined length of the tape is attached to the package.

3. A system in accordance with claim 1, wherein the pull-tab is formed when the tape is dispensed from the tape dispensing apparatus.

4. A system in accordance with claim 1, wherein the tape is gummed tape.

5. A system in accordance with claim 1, wherein the pull-tab is formed by the cutter cutting the tape.

6. A system in accordance with claim 1, wherein the non-adhesive section of the first side of the predetermined length of tape is disposed to generally bi-sect the self-adhesive section longitudinally, and wherein the ribbon is disposed on the non-adhesive section of the predetermined length of tape.

7. A system in accordance with claim 1, wherein the tear strip extends from a first end of the predetermined length of tape to a second end of the predetermined length of tape.

8. A system in accordance with claim 1, wherein the tape dispensing apparatus comprises an adhesive activation section for activating an inactive adhesive on the tape, the adhesive activation section having a moisture delivering area delivering moisture to the tape being dispensed from the tape dispensing apparatus and forming the self-adhesive section on the first side of the predetermined length of tape.

9. A system in accordance with claim 8, wherein the tape dispensing apparatus has a shield strip over the moisture delivering area for preventing moisture delivery to a section of the tape being dispensed from the tape dispensing apparatus and forming the non-adhesive section on the first side of the predetermined length of tape.

10. A gummed tape dispensing apparatus comprising:
    a frame with a storage area for storing gummed tape therein, and having an exit area through which gummed tape is dispensed;
    a feeding mechanism connected to the frame, the feeding mechanism feeding the gummed tape from the storage area to the exit area; and
    a wetting system connected to the frame for wetting a side of the gummed tape and activating a moisture activated adhesive on the side of the gummed tape;
    wherein the wetting system has a shield which covers part of the wetting system and prevents a portion of the side of the gummed tape from being wetted while an adjoining portion of the side of the gummed tape is wetted by the wetting system when the gummed tape is fed past the wetting system by the feeding mechanism.

11. A gummed tape dispensing apparatus in accordance with claim 10, wherein the wetting system includes a wetting brush disposed in a bath of adhesive activating fluid, the gummed tape being fed over the wetting brush with the side having the moisture activated adhesive coming in contact with a fluid moistened top of the wetting brush.

12. A gummed tape dispensing apparatus in accordance with claim 11, wherein the shield includes a flat strip member extending over the top of the wetting brush and preventing the side of the gummed tape from coming in contact with the top of the wetting brush in way of the flat strip member.

13. A gummed tape dispensing apparatus in accordance with claim 11, wherein the shield is a one piece member stamped from metal, the shield comprising a base member, and a flat strip member depending from the shield member.

14. A gummed tape dispensing apparatus in accordance with claim 13, wherein the base member of the shield is mounted to a side of a tub holding the bath and wetting brush therein, the flat strip member extending over the top of the wetting brush in a tape feed direction.

15. A gummed tape dispensing apparatus in accordance with claim 10, the dispensing apparatus further comprising a cutting section mounted to the frame, the cutting section having a cutting blade for cutting the gummed tape into sections dispensed through the exit area, wherein the cutting blade has a cutting edge shaped to form a tab at an end of each of the cut sections of gummed tape.

16. A gummed tape dispensing apparatus in accordance with claim 15, wherein the tab formed by the cutting edge has at least one of a generally V shape, or a generally semi-circular shape.

17. A gummed tape dispensing apparatus comprising:
a frame with a storage area for storing gummed tape therein, and having an exit area through which gummed tape is dispensed;
a feeding mechanism connected to the frame, the feeding mechanism feeding the gummed tape from the storage area to the exit area; and
a wetting system connected to the frame for wetting a side of the gummed tape and activating a moisture activated adhesive on the side of the gummed tape;
wherein the wetting system has a shield which covers part of the wetting system and prevents a portion of the side of the gummed tape from being wetted while an adjoining portion of the side of the gummed tape is wetted by the wetting system when the gummed tape is fed past the wetting system by the feeding mechanism, the shield comprising a base member for mounting the shield on the wetting system and a flat strip member depending from the base member, the flat strip member extending in a tape feed direction over the top of a wetting brush of the wetting system,
wherein the flat strip member is biased against the top of the wetting brush and presses the top of the wetting brush away from the side of the gummed tape.

18. A gummed tape dispensing apparatus comprising:
a frame with a storage area for storing gummed tape therein, and having an exit area through which gummed tape is dispensed;
a feeding mechanism connected to the frame, the feeding mechanism feeding the gummed tape from the storage area to the exit area;
a cutting section mounted to the frame, the cutting section having a cutting blade for cutting the gummed tape into sections dispensed through the exit area; and
a wetting system connected to the frame for wetting a side of the gummed tape and activating a moisture activated adhesive on the side of the gummed tape;
wherein the cutting blade has a first cutting edge for making a transverse cut across the tape, the cutting blade having a pair of secondary cutting edges projecting from the cutting blade for cutting slots into each section cut by the cutting blade, the slots being at an angle to the transverse cut.

19. A gummed tape dispensing apparatus in accordance with claim 18, wherein the cutting blade has a tab projecting from a side of the cutting blade, the tab having a pair of wall members which are disposed on the cutting blade to be aligned generally in a tape feed direction when the cutting blade cuts the gummed tape, and wherein each of the wall member has a corresponding one of the pair of secondary cutting blades disposed thereon.

20. A gummed tape dispensing apparatus in accordance with claim 18, wherein the cutting blade has a tab projecting therefrom, the tab having a general U shape and forming the pair of secondary cutting edges of the cutting blade.

* * * * *